US012513804B1

(12) United States Patent
Salter et al.

(10) Patent No.: US 12,513,804 B1
(45) Date of Patent: Dec. 30, 2025

(54) SYSTEMS AND METHODS TO CONTROL OPERATION OF VEHICLE EXTERIOR LIGHTS BASED ON USER ACTIVITY

(71) Applicant: Ford Global Technologies, LLC, Dearborn, MI (US)

(72) Inventors: Stuart C. Salter, White Lake, MI (US); Keith Weston, Canton, MI (US); Brendan Diamond, Naples, FL (US); Jessica Louise Smith, Brighton, MI (US); Ryan O'Gorman, Beverly Hills, MI (US); Todd Ansbacher, Westland, MI (US)

( * ) Notice: Subject to any disclaimer, the term of this patent is extended or adjusted under 35 U.S.C. 154(b) by 0 days.

(21) Appl. No.: 18/952,728

(22) Filed: Nov. 19, 2024

(51) Int. Cl.
*H05B 47/125* (2020.01)
*B60Q 1/00* (2006.01)
*B60Q 1/24* (2006.01)

(52) U.S. Cl.
CPC ......... *H05B 47/125* (2020.01); *B60Q 1/0023* (2013.01); *B60Q 1/0035* (2013.01); *B60Q 1/247* (2022.05)

(58) Field of Classification Search
CPC ................ B60Q 1/247; B60Q 1/249
See application file for complete search history.

(56) References Cited

U.S. PATENT DOCUMENTS

| | | | |
|---|---|---|---|
| 8,994,292 B2 | 3/2015 | Mahale et al. | |
| 9,821,707 B2 | 11/2017 | Decaluwe et al. | |
| 10,829,034 B2 * | 11/2020 | Mori | B60Q 3/76 |
| 11,372,936 B2 | 6/2022 | Ricci | |
| 11,472,332 B1 | 10/2022 | Salter et al. | |
| 2013/0249410 A1 * | 9/2013 | Thompson | H05B 47/1985 315/158 |
| 2018/0027634 A1 * | 1/2018 | Dalavayi | H05B 47/11 315/77 |
| 2018/0056851 A1 | 3/2018 | Kim et al. | |
| 2020/0146132 A1 | 5/2020 | Chen et al. | |
| 2022/0185170 A1 * | 6/2022 | Salter | H05B 47/115 |

FOREIGN PATENT DOCUMENTS

| | | | | |
|---|---|---|---|---|
| DE | 102019206644 B3 * | 8/2020 | | G06V 20/56 |
| EP | 2537709 B1 | 3/2018 | | |
| KR | 20090065112 A | 6/2009 | | |

OTHER PUBLICATIONS

Frank Houdek, et al., Adaptive Exterior Light and Speed Control System, Daimler AG, Research and Development, Stuttgart, Germany, Nov. 28, 2019, pp. 1-25.

* cited by examiner

*Primary Examiner* — Robert J May
(74) *Attorney, Agent, or Firm* — Frank Lollo; Eversheds Sutherland (US) LLP

(57) ABSTRACT

A vehicle including a sensor unit, an exterior light and a processor is disclosed. The sensor unit may capture inputs associated with vehicle surroundings. The processor may determine that a user may be performing an activity in proximity to the exterior light based on the inputs obtained from the sensor unit. The processor may also determine an activity type based on the inputs responsive to determining that the user is performing the activity. The processor may further determine an optimal lighting intensity for the exterior light based on the activity type. The processor may then illuminate the exterior light at the optimal lighting intensity.

19 Claims, 5 Drawing Sheets

SYSTEMS AND METHODS TO CONTROL OPERATION OF VEHICLE EXTERIOR LIGHTS BASED ON USER ACTIVITY

FIELD

The present disclosure relates to systems and methods to control operation of vehicle exterior lights to optimize vehicle energy consumption.

BACKGROUND

Modern vehicles have a plurality of advanced features and components that enhance the experience of operating or using the vehicles. For example, most modern vehicles have infotainment systems, cameras, proximity sensors, interior and exterior lights, and/or the like, which considerably enhances the vehicle usage experience. Furthermore, many of these vehicle components enable the users to use their vehicles for additional activities, beyond just driving/traveling. For example, the users may use some of these vehicle components for entertainment or recreational purposes, surveillance, illuminating surroundings in dark ambient conditions, and/or the like.

While the vehicle components described above considerably enhance a user's experience, these components consume vehicle energy during operation. Efforts are continuously being made to optimize energy consumption, especially when the vehicle components are used during the vehicle's key-off state.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
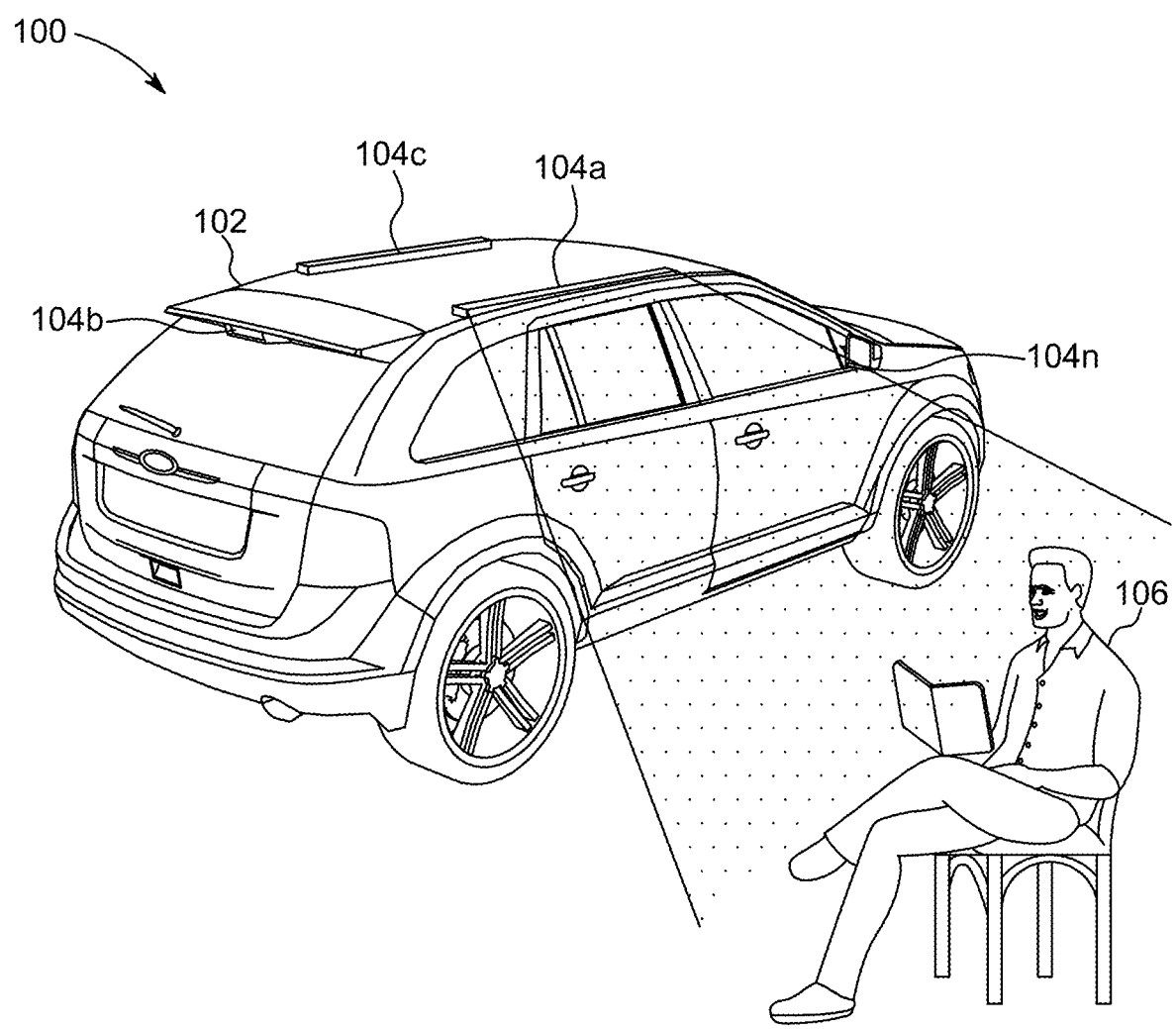
FIG. 1 depicts an environment in which techniques and structures for providing the systems and methods disclosed herein may be implemented.

The present disclosure describes a vehicle that may control operation of vehicle's exterior lights to optimize vehicle's energy consumption. Specifically, the vehicle may cause the exterior lights to illuminate at an optimal lighting intensity that may enable a user to conveniently complete an activity that the user may be performing in proximity to the vehicle, while at the same time ensuring that the vehicle's energy is not unnecessarily utilized to illuminate the exterior lights beyond the required amount.

In some aspects, the vehicle may first determine that a user may be performing an activity in proximity to the vehicle. Responsive to such determination, the vehicle may determine whether the user is an authorized user or an unauthorized user based on inputs obtained from a vehicle's sensor unit. The vehicle may determine a type of activity ("activity type") that the user may be performing based on the obtained inputs, when the vehicle determines that the user is an authorized user. Responsive to determining the activity type, the vehicle may determine a vehicle's exterior light that may be closest to the user and an ambient lighting intensity in proximity to the user, based on the obtained inputs. The vehicle may then determine an optimal lighting intensity for the exterior light based on the activity type and the determined ambient lighting intensity.

In some aspects, the vehicle may determine the optimal lighting intensity for the exterior light by subtracting the ambient lighting intensity from a desired lighting intensity required for the activity type. In some aspects, the desired lighting intensity associated with the activity type may be stored in a vehicle memory as "user preference" for lighting. In other aspects, the vehicle may itself determine the desired lighting intensity based on a look-up table or a mapping between a plurality of desired lighting intensities and a plurality of activity types that may be pre-stored in the vehicle memory.

Responsive to determining the optimal lighting intensity for the exterior light as described above, the vehicle may cause the exterior light to illuminate at the optimal lighting intensity. In some aspects, the vehicle may further obtain user feedback for the lighting intensity and may adjust the lighting intensity for the exterior light based on the user feedback.

In further aspects, the vehicle may monitor the user movement in proximity to the vehicle, the activity type being performed by the user, the ambient light intensity, the user behavior, and/or the like, based on the inputs obtained from the sensor unit, and may adjust the lighting intensity for the exterior light and/or its light projection angle when one or more of these parameters change. The vehicle may additionally adjust a sampling or polling rate at which one or more sensors of the sensor unit may be monitoring the parameters described above based on a time of day, the ambient weather conditions, the activity type being performed by the user, an amount of user movement in proximity to the vehicle, and/or the like, to further optimize the vehicle's energy consumption.

The vehicle may further "balance" the energy consumption for various vehicle features/components (including the exterior lights), to further optimize the vehicle's energy consumption. In this case, the vehicle may determine a preferred proportion of vehicle energy that may be used to illuminate the vehicle's exterior lights based on one or more parameters including, but not limited to, a historical usage pattern of vehicle exterior lights, a vehicle geolocation, an expected vehicle travel route, a vehicle battery state of charge (SoC), a vehicle fuel level, profiles of one or more occupants in the vehicle, a time of day, a user preference, an expected time duration for a completion of the activity, weather conditions in a geographical area where the vehicle is located, and/or the like.

The vehicle may further determine an actual proportion of vehicle energy that is being used to illuminate the exterior lights and compare it with the determined preferred proportion. The vehicle may output an alert notification for the user when the actual proportion is greater than the preferred proportion. The user may perform one or more remedial actions responsive to viewing/hearing the alert notification, thereby facilitating in optimizing the vehicle's energy usage. In some aspects, the vehicle may additionally adjust the lighting intensity associated with the exterior lights based on the determined preferred proportion.

The present disclosure discloses a vehicle that controls the operation of vehicle's exterior lights to optimize the vehicle's energy consumption. Specifically, the vehicle causes the exterior lights to illuminate at an optimal lighting intensity, such that the user may comfortably perform the activity in proximity to the vehicle, while at the same time ensuring that a large amount of vehicle's energy is not unnecessarily consumed. The vehicle further enables the user to "balance" the vehicle's energy consumption between different vehicle features/components, so that the exterior lights do not consume a substantial proportion of vehicle energy during illumination. Furthermore, the vehicle may dynamically adjust the lighting intensity of exterior lights, their angles, sampling rate of one or more vehicle sensors, and/or the like, as the user performs the activity in proximity to the vehicle, so that the vehicle's energy consumption is further optimized.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, in some aspects, the vehicle 102 may be an Electric Vehicle (EV) or a Plug-in Hybrid Electric Vehicle (PHEV). In other aspects, the vehicle 102 may be an Internal Combustion Engine (ICE) vehicle.

In some aspects, the vehicle 102 may include a plurality of exterior lights 104a, 104b, 104c, 104n (or "zone lights", collectively referred to as exterior lights 104) that may be located at different vehicle locations/portions. For example, a first exterior light 104a may be located at a right top vehicle portion, a second exterior light 104b may be located at a rear top vehicle portion, a third exterior light 104c may be located at a left top vehicle portion, a fourth exterior light 104n may be located in proximity to a right rearview mirror, and/or the like. The example locations of the exterior lights 104 described above and depicted in FIG. 1 should not be construed as limiting. The exterior lights 104 may be located at other exterior vehicle portions, without departing from the present disclosure scope. Furthermore, the vehicle 102 may include more or less than the four exterior lights described above, without departing from the present disclosure scope.

The exterior lights 104 may illuminate portions/areas/zones in proximity to respective exterior lights, and may enable one or more users (e.g., a user 106) to perform one or more activities in proximity to the vehicle 102 that may require lighting or illumination (e.g., when the ambient light may be dark). For example, the user 106 may read a book (as shown in FIG. 1), move items (e.g., tools, plants, shrubs, etc.) from one location to another in proximity to the vehicle 102, assemble or disassemble an equipment/toy, play games, cut wood, perform gardening activities, and/or the like in proximity to the vehicle 102. The exterior light(s) 104 may illuminate the area/zone where the user 106 may be performing the activity described above, so that the user 106 may conveniently perform the activity even when the ambient light may be dark.

The exterior lights 104 may illuminate the respective zones when the vehicle 102 may be in keyed-on or keyed-off state. Stated another way, the user 106 may use the exterior lights 104 for illumination when the vehicle 102 may be keyed-on (i.e., when the vehicle engine may be switched ON) or keyed-off (i.e., when the vehicle engine may be switched OFF). It may be appreciated that the exterior lights 104 may consume vehicle battery's energy when the exterior lights 104 may be activated. The vehicle 102 may optimize energy consumption when the exterior lights 104 may be operating, so that the exterior lights 104 do not consume energy beyond or above the required amount (i.e., the exterior lights 104 do not unnecessarily consume large amounts of energy), while at the same time ensuring that the user 106 conveniently performs the activity in proximity to the vehicle 102 with an adequate/required level of illumination. By optimizing the energy consumption, especially when the exterior lights 104 are illuminated during the vehicle's key-off state, the vehicle 102 may ensure that the battery energy is optimally used for all critical key-off loads (KOL) and the exterior lights 104 do not unnecessarily consume a large proportion of battery energy. Further, by optimizing the energy consumption, the vehicle 102 may ensure that the vehicle battery has enough state of charge (SoC) left to effectively crank the vehicle engine, e.g., when the user 106 desires to start and drive the vehicle 102 (after the key-off state). Example steps/processes executed by the vehicle 102 to optimize the energy consumption for exterior light operation are briefly described below and described in detail later in conjunction with FIG. 2.

Figure 2:
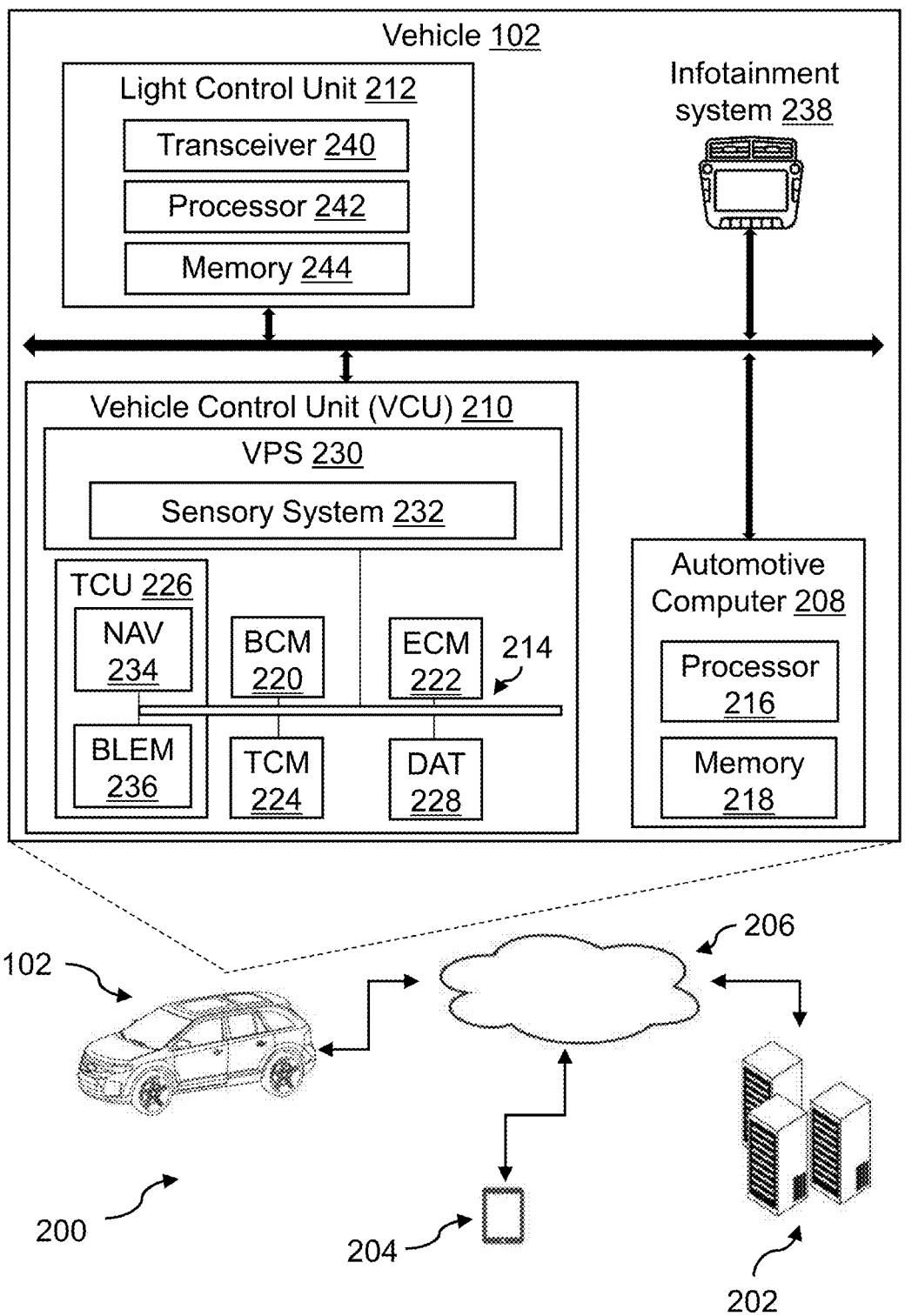
FIG. 2 depicts a block diagram of a system to control operation of vehicle exterior lights in accordance with the present disclosure.

In some aspects, the vehicle 102 may first determine that the user 106 may be located in proximity to the vehicle 102 based on inputs obtained from a vehicle's sensor unit (shown as vehicle sensory system 232 in FIG. 2). The sensor unit may include one or more vehicle exterior cameras, radar sensors, lidar sensors, Bluetooth Low Energy (BLE) transceivers, Phone-as-a-key transceivers, and/or the like. Responsive to determining the user presence in proximity to the vehicle 102, the vehicle 102 may attempt to "recognize" the user 106 to determine whether the user 106 is an authentic/authorized user or an unauthorized user. In some aspects, an authorized user may be a vehicle owner or any other user (e.g., a user's family member, friend, etc.) whose details (e.g., facial features, fingerprints, etc.) may be pre-registered with the vehicle 102 or whose user devices may be pre-synced or pre-registered with the vehicle 102. The vehicle 102 may determine that the user 106 may be an authorized user based on facial recognition technology (e.g., by using images captured by the vehicle's exterior cameras) and/or based on inputs obtained from the vehicle's BLE transceivers, Phone-as-a-key transceivers and/or other similar transceivers. In the latter case, the vehicle 102 may determine that the user 106 may be an authorized user when a user device (e.g., a wireless tag, a key fob, a mobile phone, etc., shown as a user device 204 in FIG. 2) associated with or carried by the user 106 communicatively couples with the transceivers described above. On the other hand, the vehicle 102 may determine that the user 106 may be an unauthorized user when the transceivers does not couple with the user device associated with the user 106.

Responsive to determining that the user 106 may be an unauthorized user, the vehicle 102 may not activate the exterior lights 104, thereby conserving the vehicle's energy consumption. On the other hand, responsive to determining that the user 106 may be an authorized user, the vehicle 102 may commence a process to determine an optimal illumination intensity of an exterior light (from the exterior lights 104) that the user 106 may require, which may ensure that the vehicle's energy is not unnecessarily consumed and at the same time the user 106 comfortably performs the activity in proximity to the vehicle 102.

In this case, the vehicle 102 may first identify an exterior light (e.g., the exterior light 104a) in proximity of which the user 106 may be located and performing an activity, e.g., reading a book, as shown in FIG. 1. The vehicle 102 may then determine a type of activity ("activity type") that the user 106 may be performing based on the inputs obtained from the sensor unit. In some aspects, the vehicle 102 may include an Artificial Intelligence/Machine Leaning (AI/ML) based processor (shown as a processor 242 in FIG. 2) that may analyze the user images captured by vehicle's exterior cameras to determine the activity type.

The vehicle 102 may further obtain/fetch a user profile associated with the user 106 from a vehicle memory (shown as memory 244 in FIG. 2) or a server (shown as server 202 in FIG. 2), which may include user preferences associated with user-preferred illumination intensities for different types of activities that the user 106 may perform in proximity to the vehicle 102. Specifically, the user profile may include a mapping of user-preferred illumination intensities with different activity types. For example, the user profile may indicate that the user 106 prefers 500 Lux of illumination when the user 106 reads a book in proximity to the vehicle 102.

Responsive to obtaining the user profile, the vehicle 102 may determine an ambient lighting level or ambient light intensity in proximity to the user 106 (i.e., the illumination naturally present in proximity to the user 106 due to the sun, lamppost, or any other lighting means). The vehicle 102 may then correlate the ambient light intensity with the user-preferred illumination intensity for the type of activity that the user 106 may be performing (e.g., reading a book) to determine an optimal illumination intensity at which to illuminate the exterior light 104a (i.e., the exterior light closest to the user 106). The vehicle 102 may then illuminate the exterior light 104a at the optimal illumination intensity. In this manner, the vehicle 102 may cause the exterior light 104a to illuminate at an intensity that may be based on the type of activity that the user 106 may be performing.

The vehicle 102 may determine the optimal illumination intensity for the exterior light 104a such that the total light intensity (i.e., the sum of the optimal illumination intensity and the ambient light intensity) at the zone/area where the user 106 is located is equivalent to the user-preferred illumination intensity. In this manner, the vehicle 102 may ensure that the user 106 receives the optimal level of lighting that the user 106 prefers while reading a book. Further, by illuminating the exterior light 104a at the optimal illumination intensity (e.g., a minimum amount of additional light over the ambient light, and not more), the vehicle 102 may ensure that the exterior light 104a does not consume unnecessary energy. For example, when the ambient light may be relatively bright (or not too dark), the vehicle 102 may illuminate the exterior light 104a at a relatively lower illumination intensity, thereby facilitating the optimization of energy consumption.

In further aspects, the vehicle 102 may seek user feedback (via the vehicle's microphones, user's audio and/or gesture commands, etc.) confirming whether the lighting intensity in proximity to the user 106 is comfortable or requires adjustment. The vehicle 102 may adjust the optimal illumination intensity for the exterior light 104a based on the user feedback.

The vehicle 102 may additionally monitor (based on the inputs obtained from the sensor unit) the user behavior, the activity being performed by the user 106 in proximity to the vehicle 102, a distance of the user 106 from the exterior light 104a (and other vehicle's exterior lights), the ambient light intensity, the total light intensity at the zone/area where the user 106 is located, and/or the like, and may adjust the optimal illumination intensity for the exterior light 104a based on the monitoring. For example, if the vehicle 102 determines that the user 106 may be using an external light source (e.g., a torch or light of user's mobile phone) to project additional light to the book, the vehicle 102 may determine that the light projected by the exterior light 104a may not be enough for the user 106. Responsive to such determination, the vehicle 102 may increase the optimal illumination intensity for the exterior light 104a.

As another example, if the vehicle 102 determines that the user 106 is moving away from the exterior light 104a (while performing the activity, e.g., reading the book) and towards the exterior light 104b, the vehicle 102 may reduce the illumination associated with the exterior light 104a and may illuminate the exterior light 104b at an optimal illumination intensity associated with a distance between the user 106 and the exterior light 104b. As yet another example, if the vehicle 102 determines that the user 106 has changed the activity that the user 106 was earlier performing (e.g., the user 106 starts to play a board game or assemble a toy, instead of reading the book), the vehicle 102 may automatically adjust the optimal illumination intensity for the exterior light 104a based on the new activity type and the corresponding user preference for the illumination intensity. As yet another example, the vehicle 102 may adjust the optimal illumination intensity for the exterior light 104a if the ambient light intensity changes.

In further aspects, the vehicle 102 may adjust a sampling rate at which the sensor unit may be recording or polling the parameters described above based on a plurality of aspects including, but not limited to, a time of day, ambient weather conditions, the activity type, an amount or extent of user movement in proximity to the vehicle 102 while performing the activity, and/or the like. For example, the vehicle 102 may reduce the sampling rate associated with the ambient light intensity sensors during the daytime (e.g., closer to noon time), as the ambient light intensity is not expected to change drastically at this time within a short time duration. As another example, the vehicle 102 may reduce the sampling rate or image capturing rate associated with the vehicle's exterior cameras if the user 106 is repairing a fence in proximity to the vehicle 102 or performing any other activity which may take a longer time duration to complete and hence it may not be expected that the user 106 may change the activity soon or move quickly and/or substantially within a short time duration.

By adjusting (e.g., reducing) the sampling rate associated with one or more sensors as described above, the vehicle 102 may additionally conserve energy, which otherwise would have been used to unnecessarily monitor the user 106, the activity, the ambient conditions, and/or the like, at a higher sampling rate.

In additional aspects, to further optimize the vehicle's energy consumption and enhance the user convenience, the vehicle 102 may balance power consumption between the exterior light operation feature and other vehicle loads or may enable the user 106 to balance the power consumption between different vehicle loads (including the exterior lights 104). In this case, the vehicle 102 may first determine a preferred proportion of vehicle's battery energy that may be used to illuminate the exterior light 104a (and/or other vehicle's exterior lights), and may then output an alert notification for the user 106 if the actual utilization of battery's energy for the external light operation exceeds the preferred proportion. For example, the vehicle 102 may output an alert notification if the illumination of one or more exterior lights 104 for the activity type being performed by the user 106 is consuming 40% of vehicle's battery energy and the preferred proportion is less than 30% for the exterior light activation feature. In this case, responsive to viewing/hearing the alert notification, the user 106 may perform one or more remedial actions (e.g., switch OFF the exterior lights 104, change the activity, switch ON the vehicle engine to charge the battery if the vehicle 102 is an ICE vehicle, etc.) or may allow the vehicle 102 to continue using the higher proportion of battery energy for exterior light illumination.

In some aspects, the vehicle 102 may determine the preferred proportion of vehicle's battery energy that may be used to illuminate the exterior light 104a based on user preferences/inputs. Stated another way, in this case, the vehicle 102 may enable the user 106 to define the proportion of battery energy that the user 106 desires to use for the exterior light activation/operation feature (and/or other vehicle's KOL) or enable the user 106 to "balance" the vehicle's battery energy between different vehicle features (including the exterior light activation feature).

In other aspects, the vehicle 102 may itself determine the preferred proportion of vehicle's battery energy that may be used to illuminate the exterior light 104a based on one or more parameters. Examples of such parameters include, but are not limited to, historical usage pattern of the exterior lights 104, a vehicle geolocation, an expected vehicle travel route or navigation path for a future trip, a current vehicle battery SoC level, a current vehicle fuel level, profiles of one or more occupants in the vehicle 102, a time of day, an expected time duration for a completion of the activity that the user 106 may be performing, weather conditions in a geographical area where the vehicle 102 is located, and/or the like. For example, the vehicle 102 may determine that the preferred proportion of vehicle's battery energy that may be used to illuminate the exterior light 104a should be low when the battery SoC level may be low, or when the expected vehicle travel route for a future trip indicates that the vehicle 102 may be required to travel for a long distance.

In some aspects, responsive to determining the preferred proportion of vehicle's battery energy as described above, the vehicle 102 may adjust the optimal lighting intensity for the exterior light 104a according to the preferred proportion, to optimize the vehicle's energy consumption.

Further vehicle 102 details are described below in conjunction with FIG. 2.

The vehicle 102 implements and/or performs operations, as described here in the present disclosure, in accordance with the owner manual and safety guidelines. In addition, any action taken by the user 106 based on the notifications provided by the vehicle 102 should comply with all the rules specific to the location and operation of the vehicle 102 (e.g., Federal, state, country, city, etc.). The notifications, as provided by the vehicle 102 should be treated as suggestions and only followed according to any rules specific to the location and operation of the vehicle 102.

FIG. 2 depicts a block diagram of a system 200 to control operation of the exterior lights 104 in accordance with the present disclosure. While describing FIG. 2, references will be made to FIGS. 3 and 4.

The system 200 may include the vehicle 102, one or more servers 202 (or a server 202) and a user device 204 that may be communicatively coupled with each other via one or more networks 206. The user device 204 may be associated with the user 106, and may include, for example, a mobile phone, a computer, a laptop, a tablet, a smartwatch, a wireless tag or any other device with communication capabilities. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet.

In further aspects, the server 202 may store facial details, fingerprint details, and/or other biological authentication details of a plurality of authorized users (including the user 106) associated with the vehicle 102. The server 202 may further store user profiles associated with the plurality of authorized users. As described above in conjunction with FIG. 1, a user profile may include user preferences associated with user-preferred illumination intensities for different types of activities that the respective users may perform in proximity to the vehicle 102. Specifically, a user profile may include a mapping of user-preferred illumination intensities with different activity types that the respective users may perform in proximity to the vehicle 102.

The server 202 may additionally store information associated with historical usage pattern of the exterior lights 104, an expected vehicle travel route for a future trip (determined based on user inputs or historical vehicle's travel pattern), and/or the like.

The server 202 may transmit the details, information, user profiles, etc. described above to the vehicle 102 at a predefined frequency or when the vehicle 102 transmits a request to the server 202 to obtain such information. In other aspects, the server 202 may be associated with a weather monitoring firm, and may transmit real-time and expected future weather conditions (e.g., ambient temperature, expected sunset or sunrise time, probability of rain, snow, cloudy weather, and/or the like) to the vehicle 102 at a predefined frequency.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210 and a light control unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a light control program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 202), and other vehicles operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc.

The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, tilt and motion sensors, wheel sensors, ambient weather sensors, ambient light sensors, vehicle internal and external cameras, one or more rain sensors, a humidity sensor, a tire pressure sensor, ultrasonic sensors, etc. In some aspects, the vehicle sensory system 232 may capture inputs (e.g., images) associated with vehicle surroundings. For example, the vehicle exterior cameras may capture user images when the user 106 may be located in proximity to the vehicle 102 and/or performing an activity in proximity to the vehicle 102.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., the user device 204, a key fob, an NFC device, etc.), computers, and modules. The NAV receiver 234 may determine a real-time vehicle geolocation. The TCU 226 may be in communication with the ECUs 214 by way of a bus.

In some aspects, the vehicle 102 may further include one or more BLE transceivers, Phone-as-a-key transceivers, and/or other similar transceivers, which may be part of the vehicle's sensor unit and may facilitate the vehicle 102 to determine whether a user (e.g., the user 106) in proximity to the vehicle 102 is an authorized user or an unauthorized user. Specifically, the transceivers described above may enable the vehicle 102 to determine whether a user device (e.g., the user device 204) carried by the user 106 is pre-synced or pre-registered with the vehicle 102. The vehicle 102 may determine that the user 106 is an authorized user when the inputs from the transceivers indicate that the user device 204 is pre-registered with the vehicle 102, and may determine that the user 106 is an unauthorized user when the inputs from the transceivers indicate that the user device 204 is not pre-registered with the vehicle 102.

In some aspects, the transceivers described above may automatically couple with the pre-registered user devices via BLE, UWB, NFC, etc. when these user devices may be within a predefined range of the vehicle 102, indicating to the vehicle 102 that these user devices are in proximity to the vehicle 102. Consequently, when the user 106 is present in proximity to the vehicle 102 carrying the user device 204, the vehicle 102 may check the inputs from the transceivers to determine whether the transceivers are communicatively coupled with the user device 204. In some aspects, the vehicle 102 may determine that the user 106 may be an unauthorized user when the inputs from the transceivers indicate that the transceivers are not communicatively coupled with the user device 204. On the other hand, the vehicle 102 may determine that the user 106 may be an authorized user when the inputs from the transceivers indicate that the transceivers are communicatively coupled with the user device 204.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights (including the exterior lights 104), windows, security, camera(s), fan, headlights, audio system(s), speakers, wipers, door locks and access control, mirrors, various comfort controls, enclosures, and/or the like. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may further receive user instructions/inputs via the touchscreen interface portion and/or display notifications/recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244.

The transceiver 240 may receive information/inputs from one or more external devices or systems, e.g., the user device 204, the server(s) 202, and/or the like via the network 206. For example, the transceiver 240 may receive the user biometric identification/authentication details, user profiles and/or the information described above from the server 202 (and/or the user device 204) via the network 206. Further, the transceiver 240 may transmit notifications to the external devices or systems. In addition, the transceiver 240 may receive information/inputs from vehicle 102 components such as the infotainment system 238, the VCU 210, and/or the like. Further, the transceiver 240 may transmit notifications/command signals to the vehicle 102 components such as the VCU 210, the infotainment system 238, the BCM 220, etc.

The processor 242 and the memory 244 may be the same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable medium or memory storing the light control program code. In some aspects, the memory 244 may store the details, information, user profiles, etc. that the vehicle 102 obtains from the server 202 (and/or the user device 204).

In some aspects, the processor 242 may be an AI/ML based processor that may determine a type of activity (from a plurality of different activity types) that the user 106 may be performing in proximity to the vehicle 102 based on the user images captured by the vehicle's exterior camera(s).

In operation, the processor 242 may obtain inputs from the vehicle sensory system 232 and/or the transceivers described above and determine that the user 106 may be located in proximity to the vehicle 102 and performing an activity (e.g., reading a book, as shown in FIG. 1) based on the obtained inputs. Responsive to determining the user presence in proximity to the vehicle 102 and determining that the user 106 is performing an activity, the processor 242 may determine whether the user 106 is an authorized user or an unauthorized user, based on the obtained inputs. In some aspects, the processor 242 may correlate the user's facial and/or other biometric details as determined from the user images captured by the vehicle's exterior camera(s) with the biometric details of vehicle's authorized users (that the vehicle 102 obtains from the server 202) to determine whether the user 106 is an authorized user or an unauthorized user. For example, the processor 242 may determine that the user 106 may be an authorized user when the user's facial and/or other biometric details as determined from the user images captured by the vehicle's exterior camera(s) match with the biometric details of a vehicle's authorized user. On the other hand, the processor 242 may determine that the user 106 may be an unauthorized user when the user's facial and/or other biometric details as determined from the user images captured by the vehicle's exterior camera(s) do not match with the biometric details of any vehicle's authorized user.

In further aspects, as described above, the processor 242 may determine that the user 106 may be an authorized user when the inputs obtained from the BLE transceivers, phone-as-a-key transceivers, etc. indicate that the user device 204 carried by the user 106 is communicatively coupled with the transceivers (indicating that the user device 204 is pre-registered with the vehicle 102). On the other hand, the processor 242 may determine that the user 106 may be an unauthorized user when the inputs obtained from the transceivers indicate that the user device 204 carried by the user 106 is not communicatively coupled with the transceivers (indicating that the user device 204 is not pre-registered with the vehicle 102).

The processor 242 may not illuminate any of the exterior lights 104 and perform any of the steps described below responsive to determining that the user 106 may be an unauthorized user. On the other hand, the processor 242 may determine an exterior light (e.g., the exterior light 104*a*) that may be closest to the user 106 based on the inputs obtained from the vehicle sensory system 232 and/or the transceivers, responsive to determining that the user 106 may be an authorized user.

Responsive to determining that the user 106 may be performing the activity in proximity to the exterior light 104*a* and the user 106 is an authorized user as described above, the processor 242 may execute one or more AI/ML based image processing algorithms that may be pre-stored in the memory 244 to determine an activity type associated with the activity being performed by the user 106 based on the user images captured by the vehicle's exterior camera(s) (or the inputs obtained from the vehicle sensory system 232). For example, the processor 242 may determine that the user 106 is reading a book (as an activity type) based on the user images captured by the vehicle's exterior camera(s) (which may be low power cameras).

Responsive to determining the activity type, the processor 242 may determine an ambient light intensity in proximity to the user 106 based on the inputs obtained from the vehicle sensory system 232 (e.g., based on the inputs obtained from the ambient light sensors, cameras, etc.). The ambient light may be due to other light sources such as infrastructure light, sun light, moon light, etc. The processor 242 may then determine an optimal lighting intensity for the exterior light 104*a* based on the determined activity type and the ambient light intensity. As an example, the processor 242 may determine the optimal lighting intensity for the exterior light 104*a* to be high when the ambient light intensity may be low (indicating dark surroundings). As another example, the processor 242 may determine the optimal lighting intensity for the exterior light 104*a* to be low when the ambient light intensity may be relatively higher. As yet another example, the processor 242 may determine the optimal lighting intensity for the exterior light 104*a* to be high when the user 106 may be reading a book, doing a fine assembly, or performing any task that may require higher lighting. As yet another example, the processor 242 may determine the optimal lighting intensity for the exterior light 104*a* to be low when the user 106 may be doing some crude sorting of parts, shifting items from one location to another in proximity to the vehicle 102, or performing any task that may require relatively lower lighting. It may be appreciated that the vehicle's energy consumption may be reduced when the exterior light 104*a* is illuminated at a lower light intensity. Therefore, by determining the lighting intensity for the exterior light 104*a* based on the activity type and the ambient lighting intensity, the processor 242 may optimize the vehicle's energy consumption required to operate the exterior light 104*a*.

In some aspects, the processor 242 may use a look-up table (that may be pre-stored in the memory 244) that may include a mapping of a plurality of activity types and required lighting intensities to determine the optimal lighting intensity for the exterior light 104*a* based on the determined activity type and the ambient light intensity. In some aspects, the required lighting intensity for the determined activity type may be a sum of the ambient light intensity and the optimal lighting intensity for the exterior light 104*a*. Therefore, the processor 242 may subtract the ambient light intensity from the required lighting intensity for the determined activity type (as identified from the look-up table) to determine the optimal lighting intensity for the exterior light 104*a*. Responsive to determining the optimal lighting intensity as described above, the processor 242 may illuminate, via the BCM 220, the exterior light 104*a* at the optimal lighting intensity.

In alternative aspects, responsive to determining the activity type, the processor 242 may fetch/obtain the user profile associated with the user 106 from the memory 244. The processor 242 may further determine a user preference for a desired lighting intensity associated with the activity type based on the user profile. The user preference may indicate how bright/dim the user 106 may desire the exterior lights 104 to be, based on the activity/action the user 106 may be performing. For example, the processor 242 may determine the user preference for the desired lighting intensity as 500 Lux (or any other value of illumination intensity) when the user 106 reads a book in proximity to the vehicle 102, based on the user profile.

Responsive to determining the user preference for the desired lighting intensity associated with the activity type (e.g., reading a book), the processor 242 may determine the optimal lighting intensity for the exterior light 104*a* based on the user preference/desired lighting intensity and the ambient light intensity. For example, the processor 242 may subtract the ambient light intensity from the desired lighting intensity to determine the optimal lighting intensity for the exterior light 104*a*. The processor 242 may then illuminate, via the BCM 220, the exterior light 104*a* at the determined optimal lighting intensity.

In further aspects, responsive to illuminating the exterior light 104*a* at the optimal lighting intensity, the processor 242 may obtain a user feedback from the user via the user device 204, an audio command, a gesture command, and/or the like, for the lighting intensity at which the exterior light 104*a* may be illuminating. The user feedback may indicate whether the user 106 is fine with the level of illumination of the exterior light 104*a*, or desires more or less illumination intensity. The processor 242 may adjust the optimal lighting intensity based on the user feedback. For example, the processor 242 may increase (or decrease) the optimal lighting intensity when the user feedback indicates that the user 106 desires a higher (or lower) lighting intensity. The processor 242 may then cause the exterior light 104*a* to illuminate at the adjusted lighting intensity. In some aspects, the processor 242 may also switch OFF the exterior light 104*a* when the user feedback indicates that the user 106 does not need the illumination from the exterior light 104*a*.

In some aspects, the processor 242 may output a request (via the vehicle's speakers, the user device 204, etc.) to seek the user feedback about the lighting intensity of the exterior light 104*a*, and may obtain the user feedback described above from the user 106 responsive to outputting the request. In other aspects, the processor 242 may obtain the user feedback without outputting the request.

In an exemplary aspect, the processor 242 may store the user feedback in the user profile associated with the user 106, and may use the feedback for determining optimal lighting intensity for the exterior lights 104 when the user 106 again performs the same or similar activity in the future in proximity to the vehicle 102. In this manner, the processor 242 may determine the optimal lighting intensity for the exterior light 104*a* (and/or other vehicle exterior lights) based on historical user feedback for the desired lighting intensity associated with the activity type that the user 106 may be performing.

The processor 242 may further continuously monitor, at a predefined sampling rate, the activity type that the user 106 may be performing in proximity to the vehicle 102, the ambient light intensity in proximity to the user 106 when the user 106 performs the activity, the user behavior, the user movement, the total light intensity (which may be a sum of the ambient light intensity and the light intensity at which the exterior light 104*a* may be illuminating) in an area surrounding the user 106 when the user 106 performs the activity, and/or the like, based on the inputs obtained from the vehicle sensory system 232 and/or the transceivers described above. The processor 242 may adjust the optimal lighting intensity at which the exterior light 104*a* may be illuminating and/or an angle of the exterior light 104*a* (or the angle of illumination of the exterior light 104*a*) based on the monitoring of the parameters described above.

In one exemplary aspect, the processor 242 may adjust the optimal lighting intensity at which the exterior light 104*a* may be illuminating when the activity type and/or the ambient light intensity changes. For example, the processor 242 may adjust (e.g., increase) the optimal lighting intensity for the exterior light 104*a* when the ambient light intensity reduces (e.g., due to cloud cover). As another example, the processor 242 may adjust (e.g., increase) the optimal lighting intensity for the exterior light 104*a* when the user moves to another location (while performing the same or a different activity) where the ambient light intensity may be low. In some aspects, as the ambient light decreases (e.g., during sunset or when the surrounding light lowers in intensity or is turned off, etc.), the processor 242 may intelligently diminish the light intensity for the exterior light 104*a* as the user's eyes would adjust to the change in the light, still allowing visibility but adjusting down as higher intensities are unnecessary with time based on the light source angle and the distance of the exterior light 104a relative to the work location/user 106. In this case, the processor 242 may calculate the duration sensitivity associated with ambient light reductions to determine the amount of additive light necessary (i.e., the light intensity for the exterior light 104a).

As yet another example, the processor 242 may adjust the lighting intensity for the exterior light 104a when the user 106 starts to perform a different activity (e.g., different from reading the book). In this case, the adjusted lighting intensity for the exterior light 104a may be based on the different (new) activity.

In another exemplary aspect, the processor 242 may adjust the optimal lighting intensity for the exterior light 104a and/or its angle based on the detected user movement, user behavior and/or the total light intensity in the area surrounding the user 106. For example, the processor 242 may adjust (e.g., decrease) the optimal lighting intensity for the exterior light 104a when the processor 242 determines that the user 106 may be moving away from the vehicle 102. As another example, the processor 242 may adjust (e.g., slightly decrease) the optimal lighting intensity for the exterior light 104a and/or adjust (e.g., change) the angle of the exterior light 104a when the processor 242 determines that the user 106 may be walking around the vehicle 102 talking to a friend. In this manner, the processor 242 may adjust the optimal lighting intensity for the exterior light 104a and/or its angle based on the "context" of the situation associated with the user 106 and the vehicle 102.

Figure 3:
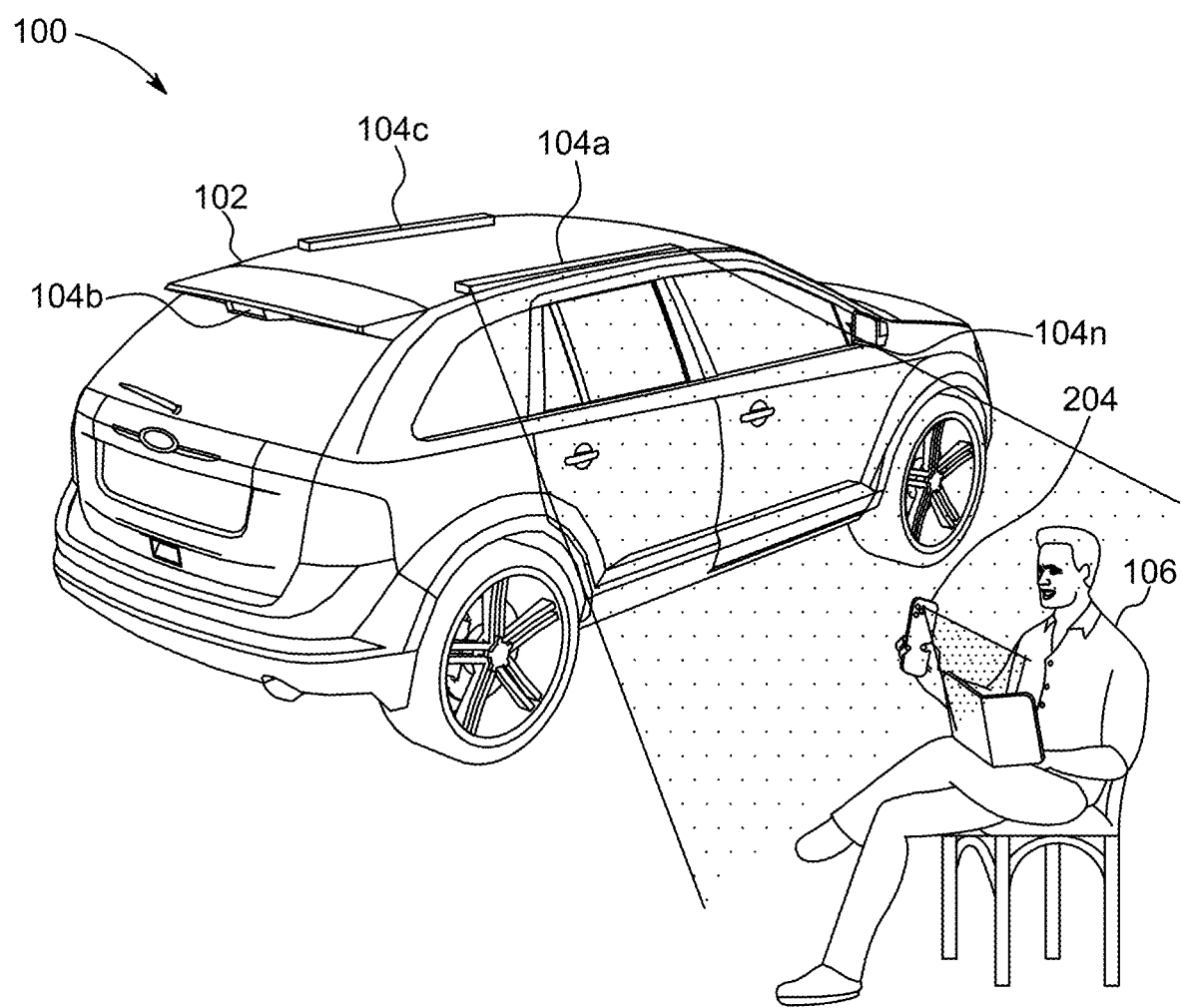
FIG. 3 depicts an example view of a user using a user device to illuminate a book in proximity to a vehicle in accordance with the present disclosure.

As another example, the processor 242 may adjust (e.g., increase) the optimal lighting intensity for the exterior light 104a and/or adjust (e.g., change) the angle of the exterior light 104a when the processor 242 determines, from the detected user behavior, that the user 106 may be struggling to perform the activity at the lighting intensity in which the exterior light 104a may be illuminating. For example, the processor 242 may adjust (e.g., increase) the optimal lighting intensity for the exterior light 104a when the processor 242 determines (e.g., based on the user images captured by the vehicle exterior cameras) that the user 106 may be using an external light source (e.g., a torch or a light associated with the user device 204, as shown in FIG. 3) to augment the lighting while performing the activity (e.g., reading the book). In this case, by automatically increasing the lighting intensity for the exterior light 104a, the processor 242 may enhance the lighting around the user 106, thereby enhancing user convenience.

As yet another example, the processor 242 may adjust (e.g., increase) the optimal lighting intensity for the exterior light 104a when the processor 242 determines (e.g., based on the user images captured by the vehicle exterior cameras) that the user 106 may be trying to focus on something or read fine letters (e.g., on a tool/paint/accessory/equipment). In this case, the processor 242 may increase the lighting intensity for the exterior light 104a when the user 106 may be focusing to read the fine letters, and may decrease the lighting intensity again when the user 106 backs off from reading, thereby ensuring that the exterior light 104a does not unnecessarily operate at a higher lighting intensity when it may not be required (thus optimizing energy consumption).

Figure 4:
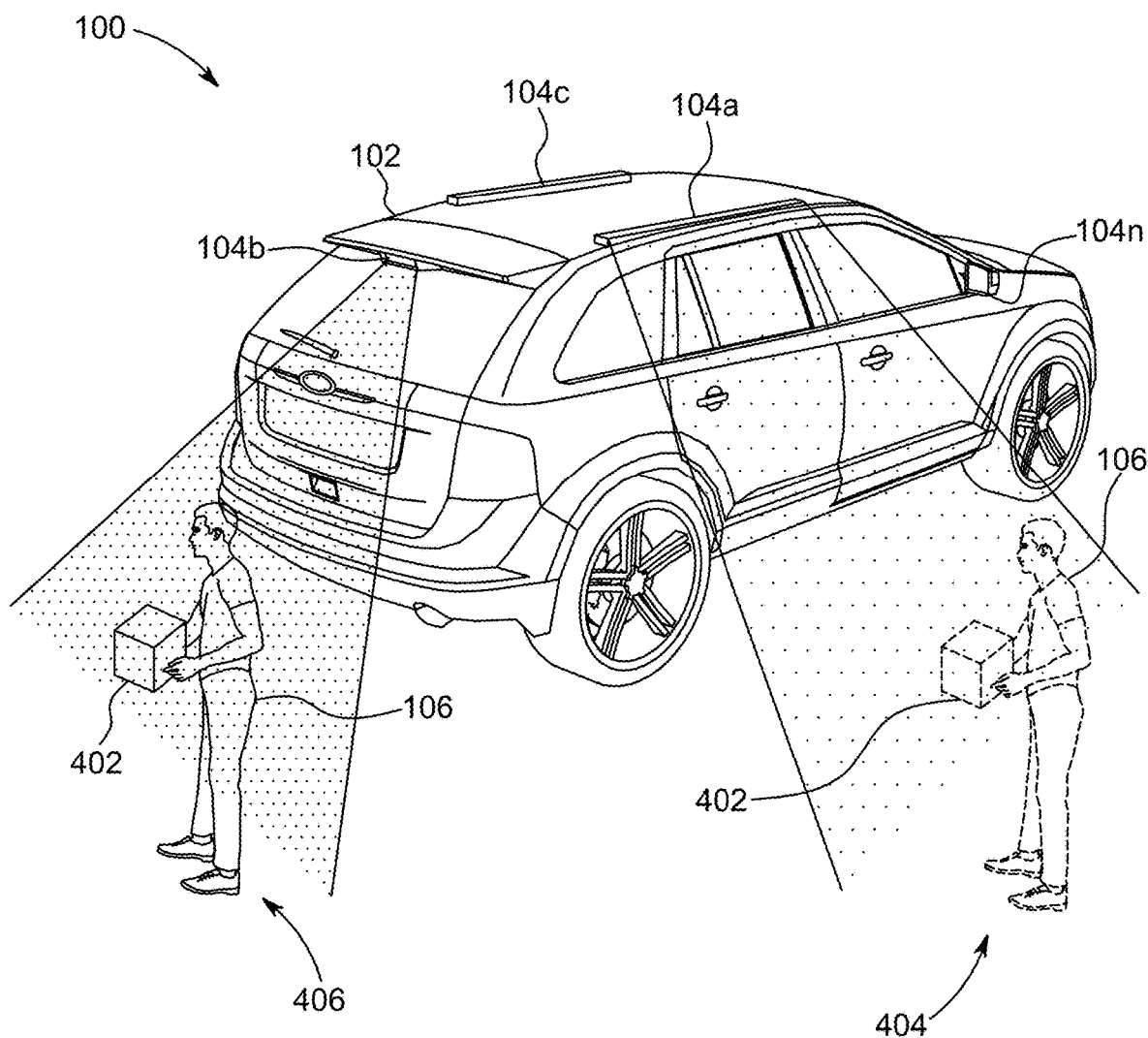
FIG. 4 depicts an example view of a user transferring items from a first location to a second location in proximity to a vehicle in accordance with the present disclosure.

As yet another example, the processor 242 may adjust the exterior light 104a angle, actuate/illuminate different exterior lights 104 and/or recommend optimal jobsite location to the user 106 in proximity to the vehicle 102 when the processor 242 determines (e.g., based on the user images captured by the vehicle exterior cameras) that the user 106 may be moving in proximity to the vehicle 102 while performing the activity. An example scenario of such an instance is depicted in FIG. 4. In this case, when the activity involves the user 106 moving items 402 (e.g., tools, plants, etc.) from a first location 404 to a second location 406 in proximity to the vehicle 102, the processor 242 may determine, based on the images obtained from the vehicle exterior cameras), that the user 106 may be moving away from the exterior light 104a and towards the exterior light 104b while performing the activity. Responsive to such determination, the processor 242 may adjust (e.g., decrease) the lighting intensity for the exterior light 104a based on a distance between the user 106 and the exterior light 104a. Further, the processor 242 may determine a secondary optimal lighting intensity for the exterior light 104b as the user 106 moves towards the exterior light 104b, based on the activity type (i.e., moving items) and a distance between the user 106 and the exterior light 104b. The processor 242 may then illuminate the exterior light 104b at the determined secondary optimal lighting intensity. In this manner, the processor 242 may ensure that the user 106 always receives enough lighting as the user 106 moves from the first location 404 to the second location 406, while at the same time causing the illumination of the exterior light 104a to gradually reduce, thereby conserving the vehicle energy.

The processor 242 may additionally identify, based on the images captured by the vehicle's exterior cameras, shadowing or shadow in proximity to the user 106 and only illuminate those exterior lights 104 that limit shadowing and light the workspace being utilized by the user 106 for the activity, while keeping all the other exterior lights turned off. In this case, the processor 242 may illuminate two exterior lights 104 at lower energy level (e.g., at lower lighting intensities) than one exterior light at a high level of lighting. With shadowing reduced, the visibility may be higher for more localized and detailed work, thereby enhancing user convenience.

The processor 242 may additionally cause an autonomous vehicle movement based on the user behavior, the lighting intensity in the area surrounding the user 106, the ambient light intensity, and/or the like, for better lighting perspectives. For example, the processor 242 may cause the vehicle 102 to move by a few inches (e.g., towards left, right, forward or reverse direction) when the processor 242 determines that such vehicle movement may enable the external lights 104 to provide better illumination to the user 106, based on the activity type and the location relative to the external lights 104 where the user 106 may be positioned.

In some aspects, the processor 242 may perform the steps described above (e.g., adjust the lighting intensity for the exterior light 104a (or other exterior lights) and/or the exterior light angle, cause vehicle movement, etc.) to ensure that a minimum amount of additional light is projected/provided by the exterior light(s) over and above the ambient light, which enables the user 106 to conveniently complete the activity while at the same time optimizing the vehicle's energy consumption. The processor 242 further monitors the user's movement in proximity to each side/portion of the vehicle 102, and accordingly activates or deactivates the exterior lights 104 based on the user's movement in proximity to each vehicle side/portion.

Furthermore, as described above, the processor 242 may continuously monitor the parameters associated with the user 106 (e.g., the user's movement), the activity, the ambient lighting condition, etc. based on the inputs obtained from the vehicle sensory system 232 and/or the transceivers described above at a predefined sampling rate. In some aspects, to further optimize the vehicle's energy consumption, the processor 242 may adjust the sampling or polling rate (i.e., a rate at which the data is obtained/captured) of one or more sensors associated with the vehicle sensory system 232 based on a time of day, ambient weather conditions, the activity type being performed by the user 106, the amount of user movement over a predefined time duration, and/or the like. For example, the processor 242 may reduce the sampling rate associated with the ambient light sensors (thereby conserving the vehicle energy) when a current time may be closer to noon time, as the ambient light is not expected to change drastically at middle of the day. As another example, the processor 242 may reduce the sampling rate associated with the exterior cameras (thereby conserving the vehicle energy) when the user 106 may be doing fencing repair or any other type of activity that may take substantial time to complete and hence the tasks/activity type may not change quickly (therefore, the processor 242 may not need to track changes in the activity type too frequently).

As yet another example, the processor 242 may reduce the sampling rate associated with the exterior cameras (thereby conserving the vehicle energy) when the detected user movement may be low. As another example, if the activity requires transitional work like moving large items, the processor 242 may reduce the intensity of any "task targeted" lighting and offset with a higher sensor tracking to allow lighting to follow the work that the user 106 may be performing.

In additional aspects, to further optimize the vehicle's energy consumption, the processor 242 may enable the user 106 to balance the vehicle's energy consumption for different vehicle features (including the illumination of the exterior lights 104) or may itself automatically balance the vehicle's energy consumption for different vehicle features, so that the exterior lights 104 do not unnecessarily consume a large proportion of vehicle's battery energy. In this case, the processor 242 may first determine a preferred proportion or percentage of vehicle's battery energy that may be used to illuminate the exterior light 104*a* (and/or other exterior lights 104) based on one or more parameters including, but not limited to, a historical usage pattern of the exterior lights 104, a vehicle geolocation, an expected vehicle travel route for a future trip (that may be provided by the user 106, obtained from the server 202 or determined based on vehicle's historical travel pattern), a vehicle battery SoC level, a vehicle fuel level, profiles of one or more occupants in the vehicle 102, a time of day, user preferences for the proportion/percentage, an expected time duration for a completion of the activity that the user 106 may be performing (which may be communicated by the user 106 to the vehicle 102 via the user device 204/HMI), weather conditions in a geographical area where the vehicle 102 may be located, and/or the like.

As an example, the processor 242 may identify a higher proportion (e.g., 40% or more) of vehicle's battery energy for the exterior lights 104 illumination when the vehicle 102 may have enough fuel or the SoC level may be high (e.g., greater than a threshold level). As another example, the processor 242 may identify a lower proportion (e.g., 20% or less) of vehicle's battery energy for the exterior lights 104 illumination when the SoC level may be low. As yet another example, the processor 242 may identify a lower proportion (e.g., 20% or less) of vehicle's battery energy for the exterior lights 104 illumination when the vehicle 102 is expected to travel for a long distance in a future trip and hence may need enough SoC level in the vehicle battery. As yet another example, the processor 242 may identify a lower proportion (e.g., 20% or less) of vehicle's battery energy for the exterior lights 104 illumination when the user 106 is expected to perform the activity for a long time duration (e.g., greater than a predefined time duration threshold).

Responsive to determining the preferred proportion or percentage of vehicle's battery energy that may be used to illuminate the exterior lights 104, the processor 242 may determine an actual proportion of vehicle energy that is being used to illuminate the exterior lights 104 at their respective optimal lighting intensities, based on the inputs obtained from the VCU 210. The processor 242 may further compare the actual proportion with the preferred proportion and output an alert notification (via the user device 204, the infotainment system 238, the vehicle's speakers, etc.) when the actual proportion may be greater than the preferred proportion. In this case, responsive to viewing/hearing the alert notification, the user 106 may perform one or more remedial actions as described above in conjunction with FIG. 1.

In some aspects, the processor 242 may additionally determine and/or adjust (e.g., increase or decrease) the optimal lighting intensity for the exterior light 104*a* (and/or other exterior lights 104) based on the determined preferred proportion/percentage, to further optimize the vehicle's energy consumption.

In additional aspects, if the vehicle 102 is part of a vehicle fleet that may be parked adjacent to each other, the vehicle 102 may monitor lighting conditions for all the vehicles located within a predefined distance of the vehicle 102, so that only a single vehicle (e.g., the vehicle 102) performs the lighting assessment for the user's requirements. In this case, the vehicle 102 performing these assessments may switch on a time basis to distribute energy work requirements in an equitable manner between all the vehicles.

Figure 5:
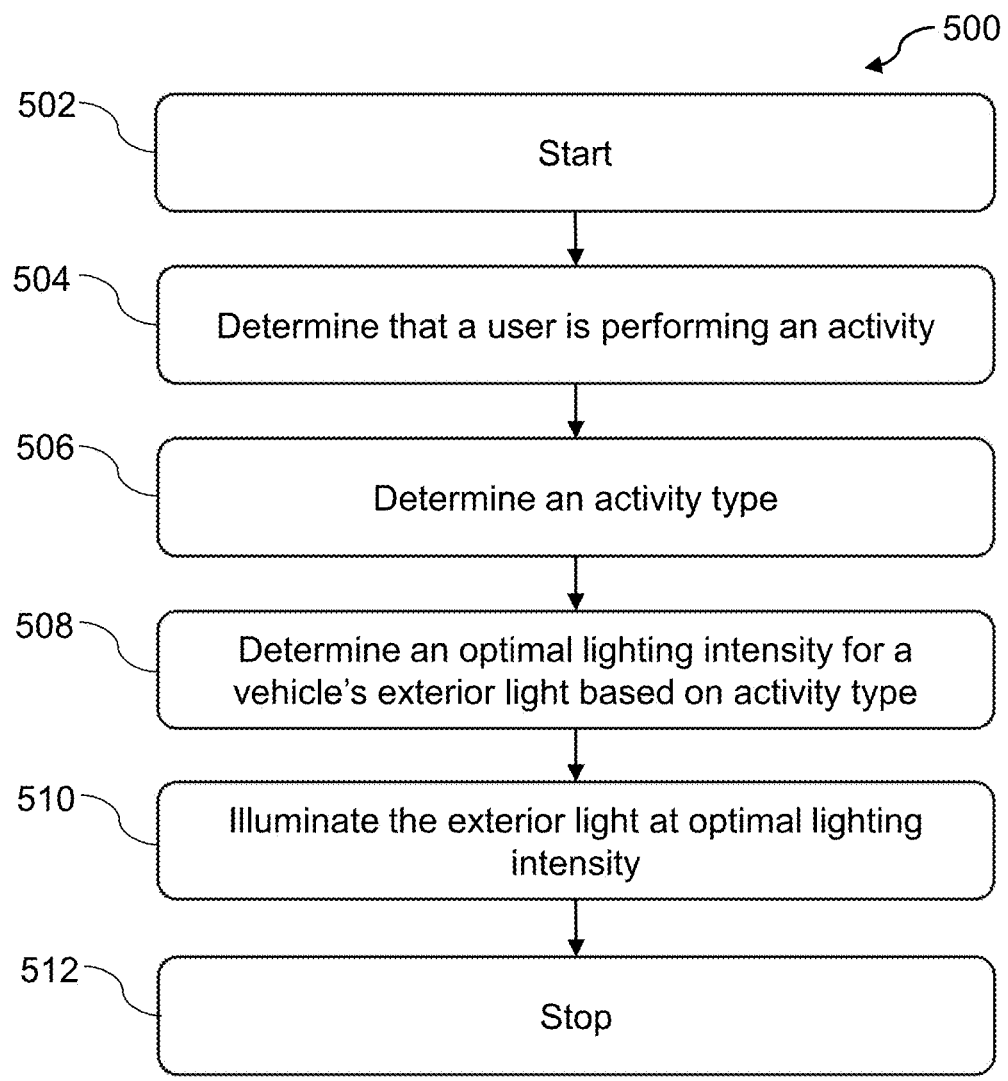
FIG. 5 depicts a flow diagram of an example method to control operation of vehicle exterior lights in accordance with the present disclosure.

FIG. 5 depicts a flow diagram of an example method 500 to control operation of the exterior lights 104 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 242, that the user 106 may be performing an activity in proximity to the exterior light 104*a* based on the inputs obtained from the vehicle sensory system 232 and/or the transceivers described above. At step 506, the method 500 may include determining, by the processor 242, the activity type based on the obtained input responsive to determining that the user 106 is performing the activity.

At step 508, the method 500 may include determining, by the processor 242, the optimal lighting intensity for the exterior light 104*a* based on the activity type, as described above. At step 510, the method 500 may include illuminating, by the processor 242, the exterior light 104*a* at the optimal lighting intensity.

At step 512, the method 500 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a sensor unit configured to capture inputs associated with vehicle surroundings;
   a first exterior light;
   a memory configured to store user profiles associated with a plurality of authorized users; and
   a processor configured to:
      determine that a user is performing an activity in proximity to the first exterior light based on the inputs obtained from the sensor unit;
      determine an activity type based on the inputs, responsive to determining that the user is performing the activity;
      determine an optimal lighting intensity for the first exterior light based on the activity type;
      illuminate the first exterior light at the optimal lighting intensity;
      determine that the user is an authorized user based on the inputs obtained from the sensor unit, responsive to determining that the user is performing the activity;
      determine the activity type responsive to determining that the user is the authorized user;
      determine an ambient light intensity in proximity to the user based on the inputs obtained from the sensor unit;
      determine the optimal lighting intensity based on the ambient light intensity;
      obtain a user profile associated with the user from the memory, responsive to determining that the user is the authorized user;
      determine a user preference for a desired lighting intensity associated with the activity type based on the user profile; and
      determine the optimal lighting intensity based on the user preference and the ambient light intensity.

2. The vehicle of claim 1, wherein the processor is further configured to:
   obtain a user feedback from the user for the optimal lighting intensity; and
   adjust the optimal lighting intensity based on the user feedback.

3. The vehicle of claim 2, wherein the processor is further configured to:
   output a request to obtain the user feedback; and
   obtain the user feedback responsive to outputting the request.

4. The vehicle of claim 2, wherein the processor obtains the user feedback via at least one of: a user device, an audio command, or a gesture command.

5. The vehicle of claim 1, wherein the processor is further configured to determine the optimal lighting intensity based on historical user feedback for a desired lighting intensity associated with the activity type.

6. The vehicle of claim 1, wherein the processor is further configured to:
monitor, at a predefined sampling rate, at least one of the activity type or an ambient light intensity in proximity to the user when the user performs the activity, based on the inputs obtained from the sensor unit; and
adjust the optimal lighting intensity when at least one of the activity type or the ambient light intensity changes.

7. The vehicle of claim 6, wherein the predefined sampling rate is based on at least one of: a time of day, ambient weather conditions, or the activity type.

8. The vehicle of claim 1, wherein the processor is further configured to:
monitor at least one of a user behavior or a lighting intensity in an area surrounding the user when the user performs the activity, based on the inputs obtained from the sensor unit; and
adjust at least one of an angle of the first exterior light or the optimal lighting intensity based on the user behavior or the lighting intensity in the area surrounding the user.

9. The vehicle of claim 8, wherein the processor is further configured to cause an autonomous vehicle movement based on the user behavior or the lighting intensity in the area surrounding the user.

10. The vehicle of claim 1 further comprising a second exterior light, wherein the processor is further configured to:
determine that the user is moving away from the first exterior light and towards the second exterior light based on the inputs obtained from the sensor unit;
adjust the optimal lighting intensity based on a distance between the user and the first exterior light;
determine a secondary optimal lighting intensity for the second exterior light based on the activity type and a distance between the user and the second exterior light; and
illuminate the second exterior light at the secondary optimal lighting intensity.

11. The vehicle of claim 1, wherein the processor is further configured to determine a preferred proportion of vehicle energy to be used to illuminate the first exterior light based on one or more parameters, wherein the one or more parameters comprise at least one of: a historical usage pattern of vehicle exterior lights, a vehicle geolocation, an expected vehicle travel route, a vehicle battery state of charge (SoC), a vehicle fuel level, profiles of one or more occupants in the vehicle, a time of day, a user preference, an expected time duration for a completion of the activity, or weather conditions in a geographical area where the vehicle is located.

12. The vehicle of claim 11, wherein the processor is further configured to determine the optimal lighting intensity based on the preferred proportion.

13. The vehicle of claim 11, wherein the processor is further configured to:
determine an actual proportion of vehicle energy used to illuminate the first exterior light at the optimal lighting intensity;
compare the actual proportion with the preferred proportion; and
output an alert notification when the actual proportion is greater than the preferred proportion.

14. The vehicle of claim 1, wherein the processor is further configured to:
monitor a user movement when the user performs the activity based on the inputs obtained from the sensor unit; and
adjust a sampling rate associated with the sensor unit based on at least one of: an amount of user movement over a predefined time duration and the activity type.

15. The vehicle of claim 1, wherein the sensor unit comprises one or more of: a proximity sensor or an exterior camera.

16. A vehicle comprising:
a sensor unit configured to capture inputs associated with vehicle surroundings;
a first exterior light; and
a processor configured to:
determine that a user is performing an activity in proximity to the first exterior light based on the inputs obtained from the sensor unit;
determine an activity type based on the inputs, responsive to determining that the user is performing the activity;
determine an optimal lighting intensity for the first exterior light based on the activity type;
illuminate the first exterior light at the optimal lighting intensity;
obtain a user feedback from the user for the optimal lighting intensity; and
adjust the optimal lighting intensity based on the user feedback.

17. A vehicle comprising:
a sensor unit configured to capture inputs associated with vehicle surroundings;
a first exterior light; and
a processor configured to:
determine that a user is performing an activity in proximity to the first exterior light based on the inputs obtained from the sensor unit;
determine an activity type based on the inputs, responsive to determining that the user is performing the activity;
determine an optimal lighting intensity for the first exterior light based on the activity type;
illuminate the first exterior light at the optimal lighting intensity; and
determine the optimal lighting intensity based on historical user feedback for a desired lighting intensity associated with the activity type.

18. A vehicle comprising:
a sensor unit configured to capture inputs associated with vehicle surroundings;
a first exterior light; and
a processor configured to:
determine that a user is performing an activity in proximity to the first exterior light based on the inputs obtained from the sensor unit;
determine an activity type based on the inputs, responsive to determining that the user is performing the activity;
determine an optimal lighting intensity for the first exterior light based on the activity type;
illuminate the first exterior light at the optimal lighting intensity;
monitor at least one of a user behavior or a lighting intensity in an area surrounding the user when the user performs the activity, based on the inputs obtained from the sensor unit;
adjust at least one of an angle of the first exterior light or the optimal lighting intensity based on the user behavior or the lighting intensity in the area surrounding the user; and cause an autonomous vehicle movement based on the user behavior or the lighting intensity in the area surrounding the user.

19. A vehicle comprising:

a sensor unit configured to capture inputs associated with vehicle surroundings;

a first exterior light; and a processor configured to:
- determine that a user is performing an activity in proximity to the first exterior light based on the inputs obtained from the sensor unit;
- determine an activity type based on the inputs, responsive to determining that the user is performing the activity;
- determine an optimal lighting intensity for the first exterior light based on the activity type;
- illuminate the first exterior light at the optimal lighting intensity; and
- determine a preferred proportion of vehicle energy to be used to illuminate the first exterior light based on one or more parameters, wherein the one or more parameters comprise at least one of: a historical usage pattern of vehicle exterior lights, a vehicle geolocation, an expected vehicle travel route, a vehicle battery state of charge (SoC), a vehicle fuel level, profiles of one or more occupants in the vehicle, a time of day, a user preference, an expected time duration for a completion of the activity, or weather conditions in a geographical area where the vehicle is located.

* * * * *